(12) United States Patent
Tuzel et al.

(10) Patent No.: US 8,306,314 B2
(45) Date of Patent: Nov. 6, 2012

(54) METHOD AND SYSTEM FOR DETERMINING POSES OF OBJECTS

(75) Inventors: Cuneyt Oncel Tuzel, Cambridge, MA (US); Ashok Veeraraghavan, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 554 days.

(21) Appl. No.: 12/648,190

(22) Filed: Dec. 28, 2009

(65) Prior Publication Data

US 2011/0157178 A1 Jun. 30, 2011

(51) Int. Cl.
*G06K 9/00* (2006.01)
*G06K 9/62* (2006.01)
(52) U.S. Cl. ......................................... 382/153; 382/209
(58) Field of Classification Search .................. 382/151, 382/153, 199, 209, 285, 291
See application file for complete search history.

(56) References Cited

U.S. PATENT DOCUMENTS 7,206,449 B2 4/2007 Raskar
7,940,960 B2 * 5/2011 Okada ........................... 382/103
* cited by examiner

*Primary Examiner* — Daniel Mariam
(74) *Attorney, Agent, or Firm* — Dirk Brinkman; Gene Vinokur

(57) ABSTRACT

A pose for an object in a scene is determined by first rendering sets of virtual images of a model of the object using a virtual camera. Each set of virtual images is for a different known pose the model, and constructing virtual depth edge map from each virtual image, which are stored in a database. A set of real images of the object at an unknown pose are acquired by a real camera, and constructing real depth edge map for each real image. The real depth edge maps are compared with the virtual depth edge maps using a cost function to determine the known pose that best matches the unknown pose, wherein the matching is based on locations and orientations of pixels in the depth edge maps.

22 Claims, 5 Drawing Sheets

METHOD AND SYSTEM FOR DETERMINING POSES OF OBJECTS

FIELD OF THE INVENTION

This invention relates generally to determining poses of objects, and more particular to determining the poses based on edges in images acquired either by a normal camera or a multi-flash camera.

BACKGROUND OF THE INVENTION

Computer vision systems are used in a number of applications, such as automatic manufacturing using robots. Most robots can only operate in restricted and constrained environments. For example, parts in assembly lines have to be placed in a known pose for robots to be able to grasp and manipulate the parts. As used herein, the pose of an object is defined as its 3D position and 3D orientation due to translations and rotations.

Methods for determining the poses of objects using 3D model to 2D image correspondences are well known. Unfortunately, those methods do not work well for objects with shiny or textureless surfaces. The situation is particularly severe when multiple identical objects are placed in a cluttered scene, for example, a bin where multiple objects are piled on top of each other.

Using chamfer matching, the contour of an object can be used to identify and determine the pose. However, conventional methods fail when the imaged contour is partially occluded, or located in a cluttered background. Edge orientation can be used to improve the chamfer matching in a cluttered background. The best computational complexity of existing chamfer matching algorithms is linear in the number of contour points.

Active illumination patterns can greatly assist computer vision methods by accurately extracting features in cluttered scenes. Examples of such methods include depth estimation by projecting a structured illumination pattern.

SUMMARY OF THE INVENTION

The embodiments of the invention provide a method and system for determining 2D or 3D poses of objects.

During an offline phase, the method models the object using a set of directional features of the object obtained from a model which may be a computer aided design (CAD) model. Using a virtual camera and a rendering engine, a set of virtual images are generated for each possible pose of the object. The virtual images and the associated poses are stored in a database for later comparison during an online phase.

During the online phase, sets of real images of a scene, including one or more of the objects in various arbitrary poses, are acquired by a real camera. This real camera can be a normal camera or a multi-flash camera. For example, the scene includes a parts bin containing the objects. Then, in an example application, the objects can be picked from the bin by a robotic arm according to their poses for further assembly. It is understood, that the method can also be used for numerous other computer vision applications in which there is a need to match edges from acquired images to edges stored in the database. Examples of such applications include object detection and localization using edges.

The images may be acquired either by a normal camera or a multi flash camera. If the images are acquired via a normal camera, then intensity edge detector like the Canny edges are used. The detected Canny edges and their orientations are used to perform matching between real and virtual images of the objects in different poses. For a multi-flash camera, the scene is illuminated by point light sources arranged in a circle around a lens of the real camera, as well as by ambient illumination. An image is acquired for each illumination. The cast shadows in the scene due to changing light sources encodes the information about the depth discontinuities in the scene. The detected depth edges and their orientations are used to perform the matching between the virtual and real images to determine the poses of the objects.

The method is particularly useful for robotic applications where multiple objects are placed in a bin, and each objects needs to picked from the bin one at the time. The method can be used with specular objects that are not richly textured and are immersed in cluttered scene.

The method uses a novel cost function that respects both the position and the local orientation of each edge pixel. The cost function is significantly superior to conventional chamfer cost functions and leads to accurate matching, even in heavily cluttered scenes where conventional methods are unreliable. The invention provides a sub-linear time procedure to compute the cost function using techniques from 3D distance transforms and integral images.

We also provide a multi-view based pose-refinement procedure to improve the estimated pose. We implemented the procedure for an industrial robot arm and obtained location and angular estimation accuracy of the order of 1 mm and 2° respectively for a variety of parts with minimal texture.

The cost function and the sub-linear time matching algorithm can also be used with a normal camera (without additional light sources) setup for detecting and localizing objects in images. The edges in the images can be detected using standard edge detection algorithms such as Canny edge detector. The input is a gallery of objects that will be localized in images. The algorithm locates the objects in the scene by matching the edges of the gallery objects to the new observed images. The object is detected if the matching cost is smaller than a user defined threshold for a given location.

DETAILED DESCRIPTION OF THE PREFERRED EMBODIMENT

Overview

Figure 1:
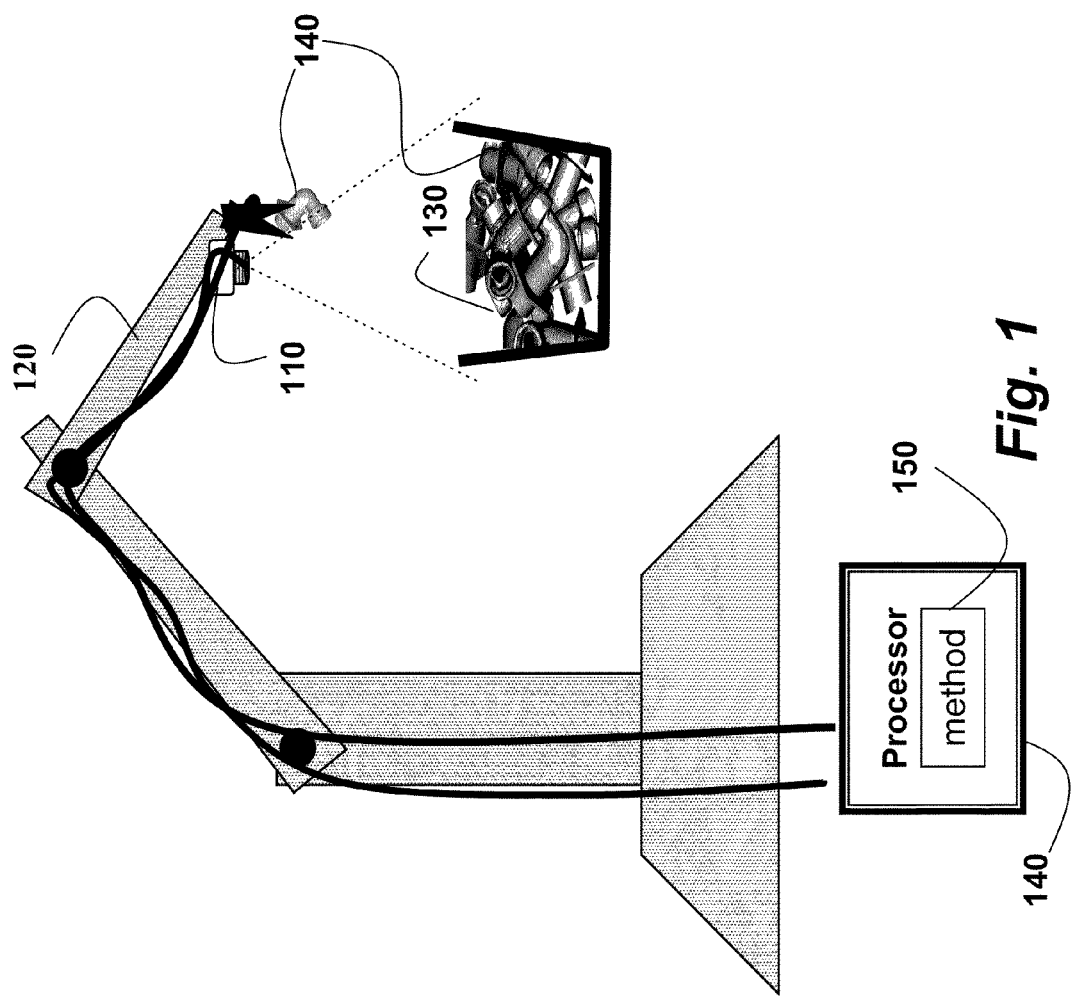
FIG. 1 is a schematic of a system for determining poses of objects according to embodiments of the invention.
Figure 2:
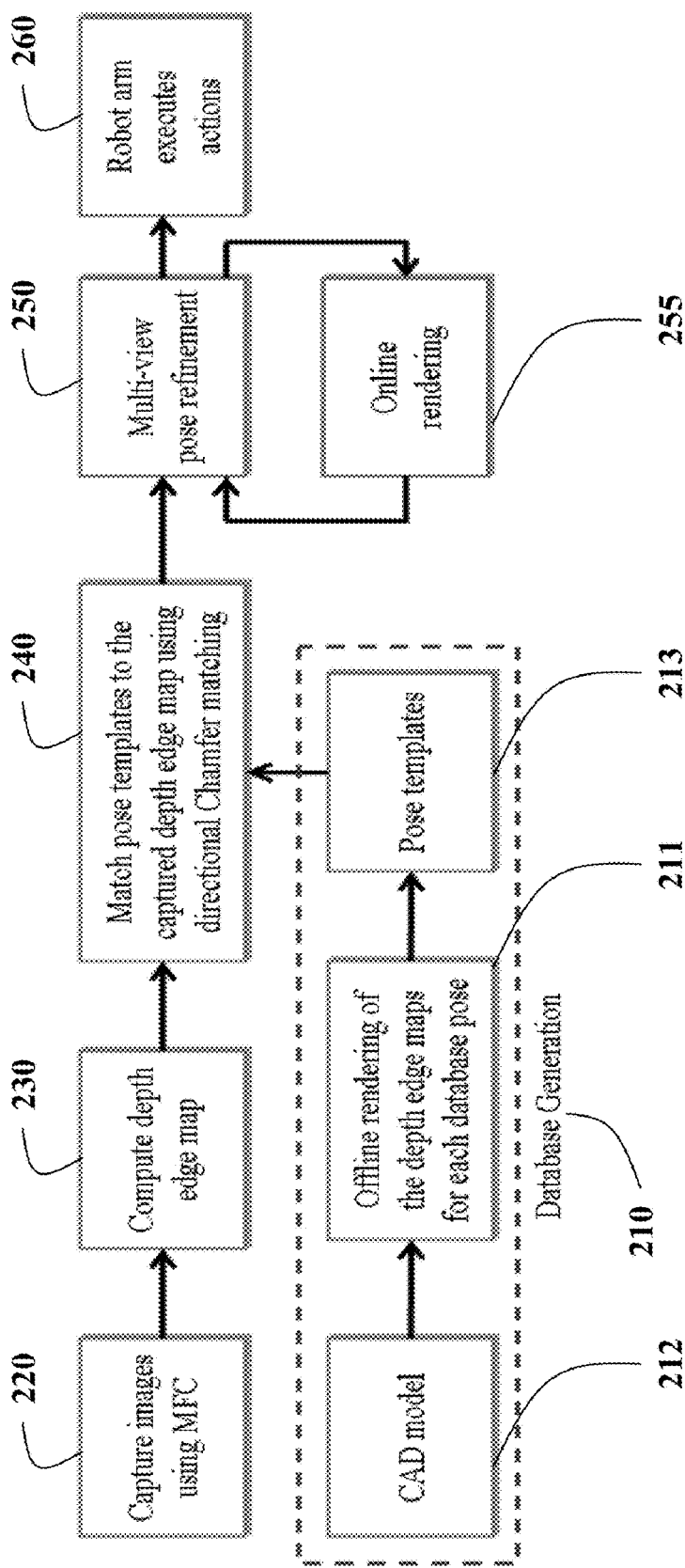
FIG. 2 is a flow diagram of a method for determining poses of objects according to embodiments of the invention.

As shown in FIGS. 1 and 2, the embodiments of our invention provide a system and method for determining poses of 3D objects. In one example application, a multi-flash camera (MFC) 110 is arranged on a robotic arm 120, see U.S. Pat. No. 7,206,449, "Detecting silhouette edges in images," incorporated herein by reference. The camera can acquires images of a scene 130 that includes multiple objects 140. The camera and the robotic arm can be connected to input/output interfaces of a processor 140 that performs the step of the method 150 for determining the poses.

In another example, a normal camera is arranged on a robotic arm. The camera acquires images of a scene that include multiple objects. The camera and the robotic arm can be connected to input/output interfaces of a processor 140 that performs the step of the method 150 for determining the poses.

In yet another example, a database of edges of objects that need to be detected in images is stored. When a test image is obtained, the edges in the test image are first computed using a Canny edge detector. This edge image is then matched with the database of edges of objects using the method described here in order to detect and localize objects in images.

Below we describe in detail the first application, but it is assumed that the other examples are also covered.

Offline Processing

As shown in FIG. 2, during an offline preprocessing phase 210, virtual depth edge maps are rendered 211 for each possible pose of the objects in the scene using a computer-aided design (CAD) model 212 to produce virtual pose template images 213 in a database.

Online Processing

During online operation of the system, the MFC acquires 220 real sets of images of the scene using eight different flashes, as well as an image when the scene is illuminated by ambient illumination.

Depth edge maps are determined 230 from the images. The virtual pose templates images 213 are matched 240 to the real edge maps using chamfer matching to determine a coarse pose.

The coarse pose is iteratively refined 250 using online rendering 255. After the pose has been determined the robot arm 120 can execute 260 some action, for example to manipulate one of the objects 140.

The MFC is an active illumination based camera that includes, e.g., eight, point light sources arranged around the lens. The MFC exploits the change in the shadows caused by changes in illumination source positions to provide depth edges, even for challenging objects such as textureless or specular objects. As the different LEDs around the camera flash, the position of the shadows cast by the object changes. Pixels on the object that are in the shadow of one of the flashes but not others change intensity significantly. This change in intensity of the shadow pixels can be used to detect and extract view dependent depth edges.

Ratio Images

First, we subtract the image acquired with just ambient illumination from the set of images acquired by the MFC images to obtain images $I_i$. A maximum intensity value at each pixel location among the images $I_i$ are located and used to construct a maximum illumination image $I_{max}(x, y) = \max_i I_i(x, y)$.

Next, we compute ratio images as $RI_i = I_i/I_{max}$. Ideally, the ratio value of a pixel in a shadow region should be zero because the contribution of the illumination from the ambient source has been removed. In contrast, the ratio values of pixels in non-shadow regions should be close to one because these regions are illuminated by all the flashes. The point of transition between the pixels in the shadow region and pixels not in the shadow region is always a depth edge. to each ratio image, we apply a Sobel filter designed to detect this transition from shadow to non-shadow, i.e., 0 to 1.

Object Detection

We now describe our method for detecting and localizing objects in cluttered scenes using depth edges acquired by the MFC in detail. Without loss of generality, we describe the method as applied to a single object. However, this assumption is only for ease of this description. In reality, the method can locate and estimate the pose of multiple objects concurrently. Similarly, we describe the method as applied to depth edges acquired from MFC, but without loss of generality the same method may also be applied to texture edges obtained from a traditional camera.

Database Generation

Given the CAD model 212 of the object, we generate 210 the database of depth edge templates 213 by simulating the MFC with software. In the simulation, a virtual camera having the internal parameters of the real MFC is placed at an origin and with an optical axis aligned with the z-axis of a world coordinate system. Eight virtual flashes are evenly placed on a circle on the x-y plane having center at the origin and a radius equal to the actual baseline between the camera and LED illumination sources.

The CAD model of the object is then placed on the z-axis at a distance $t_z$ from the virtual camera. The virtual flashes are switched on one at a time, and eight renderings of the object, including cast shadows, are acquired. The depth edges in the scene are detected 211 as described above.

Figure 3:
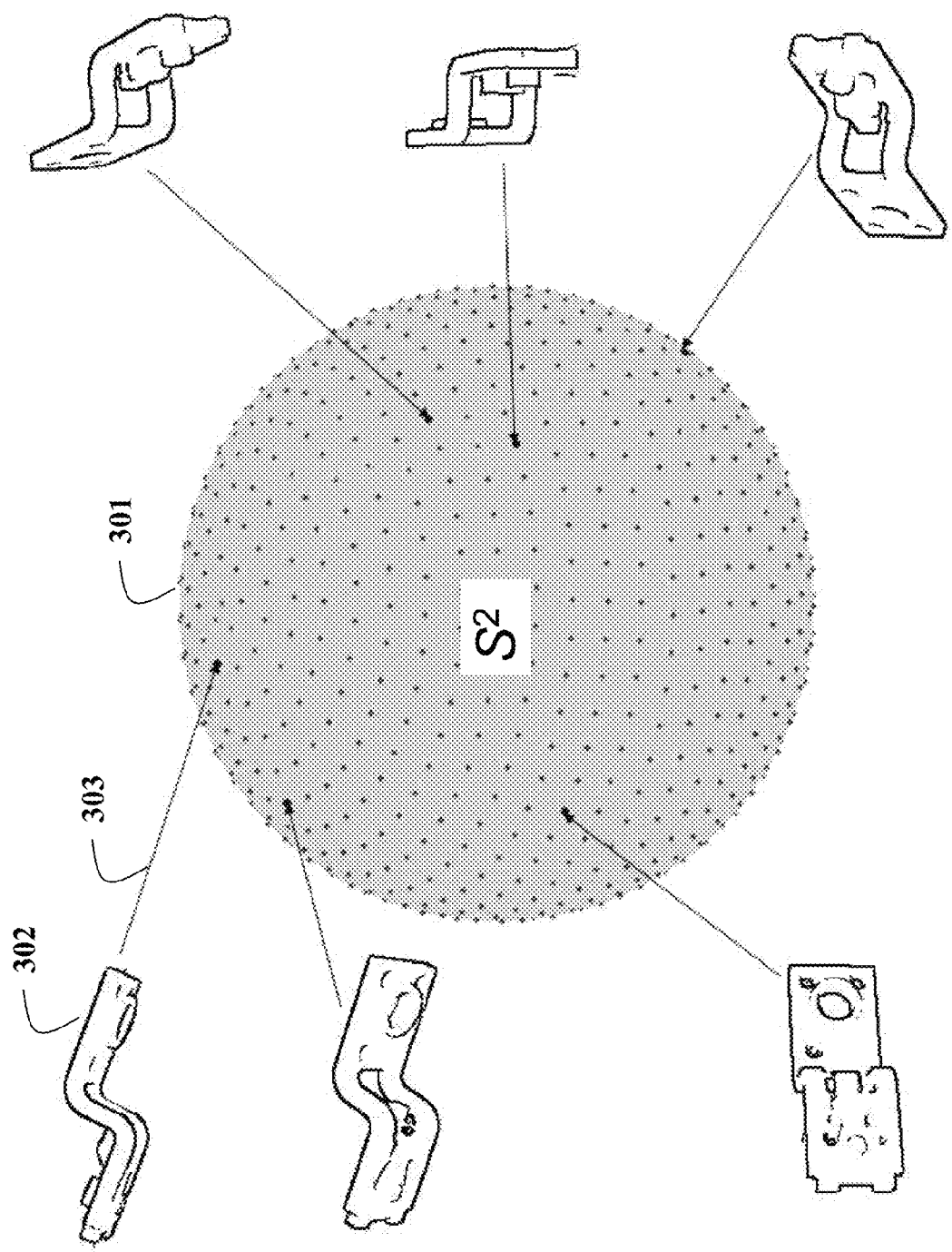
FIG. 3 is a schematic of sample rotation angles on a 2-sphere for rendering a CAD model of an object according to embodiments of the invention.

As shown in FIG. 3, for the various poses, we uniformly sample rotation angles $\theta_x$ and $\theta_y$ on a 2D surface of a sphere 301 embedded in a 3D space. The template database is generated by rendering the CAD model of the object with respect to the sampled rotations of the object 302.

An arbitrary 3D rotation can be decomposed into a sequence of three elemental rotations about three orthogonal axes. We align the first of these axes to be the camera optical axis and call the rotation about this axis as the in-plane rotation $\theta_z$. The other two axes are on a plane perpendicular to the camera optical axes, and the rotation about these two axes are called the out-of-plane rotation $\theta_x$ and $\theta_y$. The in-plane rotation results in an in-plane rotation of the observed images, whereas the effect of an out-of-plane rotation depends on the 3D structure of the object. Due to this distinction, we only include out-of-plane rotations of the object in the database. We sample k out-of-plane rotations ($\theta_x$ and $\theta_y$) 303 uniformly on the 2-sphere, $S^2$ as shown in FIG. 3, generate the depth edge templates 213 for each of these rotations.

Directional Chamfer Matching

During the template matching 240, we search for the database together with an optimal 2D Euclidean transformation, $s \in SE(2)$, which aligns the depth edges of the virtual templates 213 to the depth edges obtained from the real MFC images. A 2D Euclidean transformation is represented with three parameters, $s = (\theta_z, \bar{t}_x, \bar{t}_y)$, where $\bar{t}_x$ and $\bar{t}_y$ are the image plane translations along x and y axis respectively and $\theta_z$ is the in-plane rotation angle.

The rotation applied to an image pixel is $$W(x; s) = \begin{pmatrix} \cos(\theta_z) & -\sin(\theta_z) \\ \sin(\theta_z) & \cos(\theta_z) \end{pmatrix} x + \begin{pmatrix} \bar{t}_x \\ \bar{t}_y \end{pmatrix}. \qquad (1)$$

Chamfer matching is a technique to find a best alignment between two edge maps. Let $U = \{u_i\}$ and $V = \{v_j\}$ be the sets of virtual and real image edge maps, respectively. The chamfer distance between U and V is given by the average of distances between each pixel $u_i$ and its nearest edge pixel in V as $$d_{CM}(U, V) = \frac{1}{n} \sum_{u_i \in U} \min_{v_j \in V} |u_i - v_j|, \quad (2)$$

where $n = |U|$.

The best alignment parameter $\hat{s} \in SE(2)$ between the two edge maps is then given by $$\hat{s} = \arg\min_{s \in SE(2)} d_{CM}(W(U; s), V). \quad (3)$$

Chamfer matching becomes less reliable in the presence of background clutter. To improve accuracy, the chamfer matching can incorporate edge orientation information into the matching cost. The virtual and real image edges are quantized into discrete orientation channels and individual matching scores across channels are summed.

Although this alleviates the problem of cluttered scenes, the cost function is still very sensitive to the number of orientation channels and becomes discontinuous at channel boundaries. The chamfer distance can be augmented with an additional cost for orientation mismatch, which is given by the average difference in orientations between virtual edges and their nearest edge pixels in the real image.

Instead of an explicit formulation of orientation mismatch, we generalize the chamfer distance to pixels in $\mathfrak{R}^3$ for matching directional edge pixels. Each edge pixel x is augmented with a direction term $\phi(x)$, and the directional chamfer matching (DCM) score is now $$d_{DCM}(U, V) = \frac{1}{n} \sum_{u_i \in U} \min_{v_j \in V} |u_i - v_j| + \lambda |\phi(u_i) - \phi(v_j)|, \quad (4)$$

where $\lambda$ is a weighting factor.

The directions $\phi(x)$ are computed modulo $\pi$, and the orientation error gives the minimum circular difference between the two directions $$\min \{|\phi(x_1) - \phi(x_2)|, ||\phi(x_1) - \phi(x_2)| - \pi|\}. \quad (5)$$

The nearest pixel in V is initially located for a given virtual pixel u, and the cost function is augmented with the difference between their orientations. Therefore, our cost function jointly minimizes a sum of location and orientation error terms.

It can be easily verified that our matching cost is a piecewise smooth function of both the translation $\bar{t}_x$, $\bar{t}_y$, the rotation $\theta_z$ of the virtual template edges. Therefore, our matching is more accurate in a cluttered scene with missing edges and small misalignments, than the prior art matching.

To our best knowledge, the computational complexity for the conventional chamfer matching procedure is linear in the number of virtual template edge pixels, even without the directional term. As an advantage, we provide a sub-linear time procedure for exact computation of the 3D chamfer matching scores.

Search Optimization

The search in Eqn. 3 requires optimization over three parameters of planer Euclidean transformation ($\theta_z$, $\bar{t}_x$, $\bar{t}_y$) for each of the k templates stored in the database. If we have a 640×480 real image and a database of k=300 edge templates, then a brute-force search requires more than $10^{10}$ evaluations of the cost function in Eqn. (4).

Therefore, we perform search optimization in two stages: We use a sublinear time procedure for computing the matching score; and We reduce the three-dimensional search problem to one-dimensional queries by aligning major lines of virtual images and the real images.

Linear Representation

The edge map of the scene does not follow an unstructured binary pattern. Instead, the object contours comply with certain continuity constraints, which can be retained by concatenating line segments of various lengths, orientations and translations. We represent pixels in an edge image, see FIG. 4A, as a collection of m-line segments, see FIG. 4B. Compared with a set of pixels which has cardinality n, this linear representation is more concise. It requires only O(m) memory to store an edge map where m<<n.

We use a variant of a RANSAC (RANdom SAmple Consensus) procedure to compute the linear representation of the edge map. The procedure initially hypothesizes a variety of lines by selecting a small subset of pixels and their directions. The support of a line is given by the set of pixels which satisfy the line equation within a small residual, and form a continuous structure.

The line segment with the largest support is retained and the procedure is iterated with the reduced set until the support becomes smaller than a few pixels. The procedure only retains pixels with certain structure and support, therefore noise is filtered. In addition, the directions recovered through line fitting procedure are more precise compared with local operators such as image gradients. Any appropriate line fitting technique can also be used instead of the RANSAC based method described above.

Figure 4B:
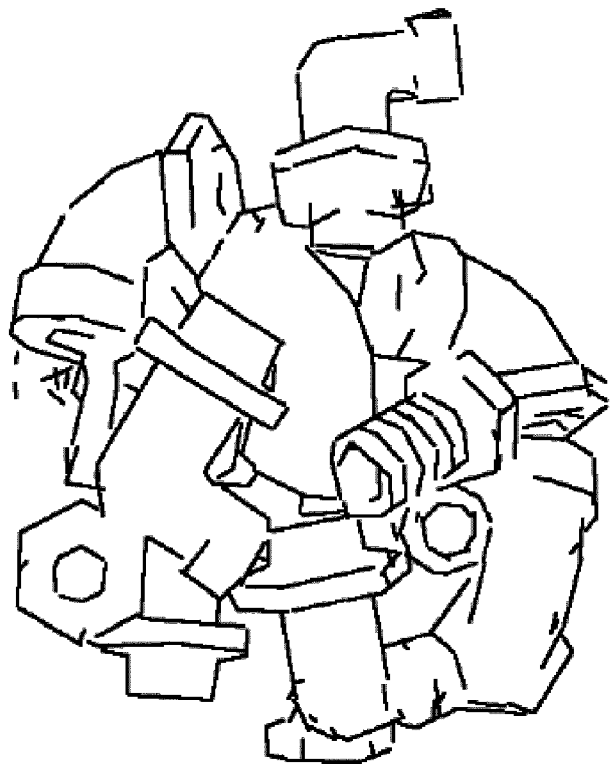
FIGS. 4A and 4B are schematics of pixels modeled as line segments respectively.
Figure 4A:
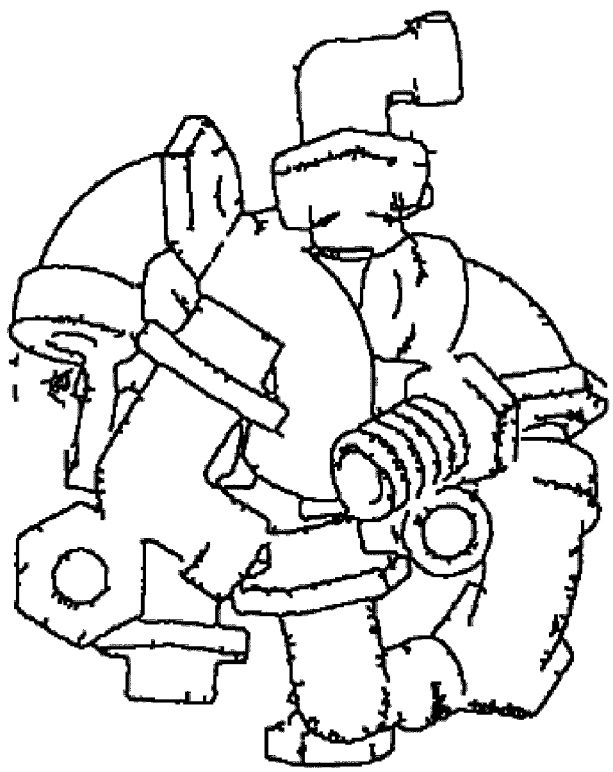

FIG. 4A shows a set of 11542 pixels that are modeled with 300 line segments as shown in FIG. 4B.

Three-Dimensional Distance Transform

The matching score given in Eqn. (4) requires finding the minimum cost match over location and orientation terms for each virtual template edge pixel. Therefore, the computational complexity of the brute force procedure is quadratic in the number of template and real image edge pixels.

Figure 5:
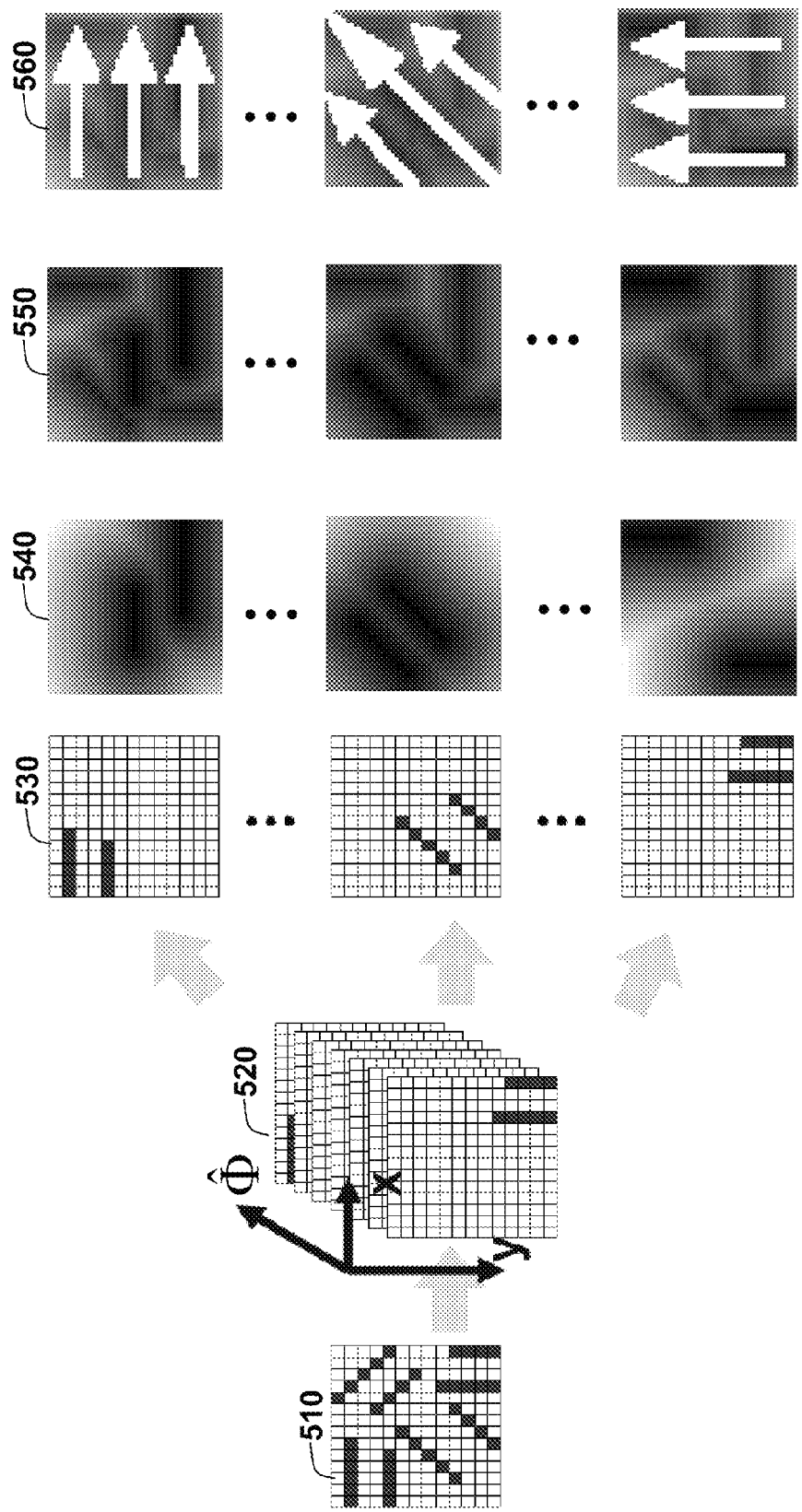
FIG. 5 is a schematic of a three-dimensional distance transform and integral image representation to compute the matching costs according to embodiments of the invention.

As shown in summary form in FIG. 5, we provide a three-dimensional distance transform representation (DT3) to compute the matching cost in linear time. This representation is a three dimensional image tensor where the first two dimensions are the locations on the image plane and the third dimension is the quantized edge orientations.

We use the edge orientation as a third dimension. The edge orientations 510 are quantized into N discrete values 520, the x-axis, the y-axis, and the edge orientation $\hat{\Phi}$. This, together with the two-dimensional pixel coordinates, form a set of 3D grid pixels 530. The quantization loses some precision in the edge orientation. However, it is not severe because the pose matching part serves only as a mean to get an initial coarse pose estimate. The exact orientations of the line segments are used during pose refinement.

In detail. the edge orientations are evenly quantized into q discrete orientation channels $\hat{\Phi} = \{\hat{\phi}_i\}$ in a range $[\pi)$. Each element of the tensor encodes the minimum distance to an edge pixel in joint location and orientation space as $$DT3_V(x, \phi(x)) = \min_{v_j \in V} |x - v_j| + \lambda |\hat{\phi}(x) - \hat{\phi}(v_j)|, \quad (6)$$

where $\hat{\phi}(x)$ is the nearest quantization level in orientation space to $\phi(x)$ in $\hat{\Phi}$.

The DT3 tensor can be computed in O(q) passes over the image. Eqn. (6) can be rewritten as $$DT3_V(x, \phi(x)) = \min_{\hat{\phi}_i \in \hat{\Phi}} \left( DT_{V\{\hat{\phi}_i\}} + \lambda |\hat{\phi}(x) - \hat{\phi}_i| \right), \quad (7)$$

where $DT_{V\{i\}}$ is the two dimensional distance transform of the edge pixels in V having orientation $\hat{\theta}_i$. Initially, we compute q two dimensional distance transforms using a conventional procedure 540. Subsequently, the $DT3_V$ tensor in Eqn. (7) is computed by solving a second dynamic program over the orientation costs, for each location separately 550.

Using the 3D distance transform representation $DT3_V$, the directional chamfer matching score of any template U can be computed as $$d_{DCM}(U, V) = \frac{1}{n} \sum_{u_i \in U} DT3_V(u_i, \hat{\phi}(u_i)). \quad (8)$$

Distance Transform Integral

Let $L_U = \{l_{[s_j, e_j]}\}_{j=1 \ldots m}$ be the linear representation of template edge pixels U where $s_j$ and $e_j$ are the start and end locations of the $j^{th}$ line, respectively. For ease of notation, we sometimes refer to a line only by its index $l_j$. We assume that the line segments only have directions among the q discrete channels $\hat{\Phi}$, which is enforced while computing the linear representation. All the pixels on a line segment are associated with the same orientation which is the direction of the line $\hat{\phi}(l_j)$. Hence, the directional chamfer matching score becomes $$d_{DCM}(U, V) = \frac{1}{n} \sum_{l_j \in L_U} \sum_{u_i \in l_j} DT3_V(u_i, \hat{\phi}(l_j)). \quad (9)$$

In this formulation, the $i^{th}$ orientation channel of the $DT3_V$ tensor is only evaluated for summing over the pixels of line segments having direction $\hat{\phi}_i$ 560.

Integral images are intermediate image representations used for fast calculation of region sums of pixels, see U.S. Pat. No. 7,454,058, "Method of extracting and searching integral histograms of data samples," incorporated herein by reference. We provide a tensor of integral distance transform representation ($IDT3_V$) to evaluate the summation of costs over any line segment in O(1) operations. For each orientation channel i, we compute the one-directional integration along $\hat{\phi}_i$ 560.

Let $x_0$ be the intersection of an image boundary with the line passing through x and having direction $\hat{\phi}_i$. Each entry of the $IDT3_V$ tensor is given by $$IDT3_V(x, \hat{\phi}_i) = \sum_{x_j \in l_{[x_0, x]}} DT3_V(x_j, \hat{\phi}_i). \quad (10)$$

The $IDT3_V$ tensor can be determined in one pass over the $DT3_V$ tensor. Using this representation, the directional chamfer matching score of any template U can be computed in O(m) operations via $$d_{DCM}(U, V) = \quad (11)$$
$$\frac{1}{n} \sum_{l_{[s_j, e_j]} \in L_U} \left[ IDT3_V(e_j, \hat{\phi}(l_{[s_j, e_j]})) - IDT3_V(s_j, \hat{\phi}(l_{[s_j, e_j]})) \right].$$

Because m<<n, the computational complexity of the matching is sub-linear in the number of template pixels n.

The O(m) complexity is an upper bound on the number of computations. For pose estimation, we would like to retain only the best hypothesis. We order the template lines with respect to their support and start the summation from the lines with the largest support. The hypothesis is eliminated during the summation if the cost is larger than the current best hypothesis. The supports of the line segments show exponential decay, therefore for majority of the hypothesis only a few arithmetic operations are performed.

One-Dimensional Search

The search for the optimal pose over three parameters of planer Euclidean transformation is computationally intensive to be practical for real-time applications. The linear representation provides an efficient method to reduce the size of the search space. The observation is that, the template and real image line segments are near perfectly aligned with the true estimate of the template pose. In addition, the major lines of the template and real images are very reliably detected during the line-fitting because the procedure favors segments with larger support.

We order template and real line segments based on their support and retain only a few major lines to guide the search. The template is initially rotated and translated such that the template virtual line segment is aligned with the direction of the real image line segment and its end pixel matches the start pixel of the real segment.

The template is then translated along the real segment direction and the cost function is evaluated only at locations where there is an overlap between the two line segments. This procedure reduces the three-dimensional search to one-dimensional searches along only a few directions. The search time is invariant to the size of the image and is only a function of number of virtual and real image lines, and their lengths.

Pose Refinement

We have to clearly state that pose refinement is an optional step and is not applicable to applications other than pose estimation. For the computer vision application that we described above, there is no pose refinement step.

The minimum cost template together with its in-plane transformation parameters $(\theta_z, \bar{t}_x, \bar{t}_y)$ provide a coarse estimate of the 3D pose of the object. Let $\theta_x$, $\theta_y$ be the out-of-plane rotation angles and $t_z$ be the distance from the camera, which are used to render the virtual image. We back project the in-plane translation parameters to 3D using a camera calibration matrix K, and the initial 3D pose of the object, $p^0$, is given by the three Euler angles $(\theta_x, \theta_y, \theta_z)$ and a 3D translation vector $(t_x, t_y, t_z)^T$.

The 3D pose p can also be written in matrix form as $$M_p = \begin{pmatrix} R_p & t_p \\ 0 & 1 \end{pmatrix} \in SE(3), \quad (12)$$

where $R_p$ is the 3×3 orthogonal matrix computed by a sequence of three rotations around x-y-z axes $R_{\theta_z} R_{\theta_y} R_{\theta_x}$, and $t_p$ is the three-dimensional translation vector.

The precision of the initial pose estimation is limited by the discrete set of out-of-plane rotations included into the database. We describe a continuous optimization method to refine the pose estimation. The proposed method is a combination of iterative closest point (ICP) and Gauss-Newton optimization.

Three-dimensional pose estimation from a single view is an ill-posed problem. To minimize the uncertainty in pose estimation, we use a two view approach, where the robot arm is moved to a second location and the scene is reimaged with the MFC. The edge pixels detected in the two views are given by the two sets $$V^{(j)} = \{v_i^{(j)}\}, j \in \{1,2\}.$$

Let $M^{(j)} \in SE(3), j \in \{1,2\}$ be the 3D rigid motion matrices determining the location of the two cameras in world coordinate system, and $P=(K\ 0)$ be the 3×4 projection matrix. The optimization procedure minimizes the sum of squared projection error between the detected edge pixels $V^{(j)}_i$, and the corresponding 3D pixels $\hat{u}^{(j)}_i$ in the 3D CAD model, simultaneously in both views $$\varepsilon(p) = \sum_j \sum_{\hat{u}_i^{(j)}} \|PM^{(j)} M_p M^{(j)-1} \tilde{u}_i^{(j)} - v_i^{(j)}\|^2. \quad (13)$$

The projection of 3D pixels $\hat{u}^{(j)}_i$ are expressed in homogeneous coordinates and in this formulation we assume that they have been converted to 2D coordinates. We find the 3D-2D pixel correspondences via closest pixel assignment on the image plane. We simulate the two camera setup, and render the 3D CAD model with respect to the current pose estimate p. Let $U^{(j)}=\{u^{(j)}_i\}, j \in \{1,2\}$ be the sets of detected edge pixels in two synthetic views and $\hat{U}^{(j)}=\{\hat{u}^{(j)}_i\}$ be the corresponding pixel sets in the 3D CAD model. For each pixel in $U^{(j)}$, we search for the nearest pixel in $V^{(j)}$ with respect to the directional matching score $$\arg\min_{v_j \in V} \|u_i - v_j\| + \lambda |\phi(u_i) - \phi(v_j)\|$$

and establish the pixel correspondences $(\hat{u}^{(j)}_i, v^{(j)}_i)$.

The non-linear least squares error function given in Eqn. (13) is minimized using the Gauss-Newton procedure. Starting with the initial pose estimate $p^0$, we improve the estimation via the iterations $p^{t+1} = p^t + \Delta p$. The update vector $\Delta p$ is given by the solution of the normal equations $(J_e^T J_e)\Delta p = J_e^T \epsilon$, where $\epsilon$ is the N dimensional vector of each of the summed error terms in Eqn. (13), and $J_e$ is the N×6 Jacobian matrix of $\epsilon$ with respect to p, evaluated at $p^t$.

The correspondence and minimization problems are solved repeatedly until convergence. The initial pose estimate given by the matching procedure is usually close to the true solution, therefore in general 5 to 10 iterations suffice for convergence.

EFFECT OF THE INVENTION

The invention provides a method and system for object detection, localization and pose estimation using a normal camera and intensity edges or a multi-flash camera (MFC) and depth edges. We reformulate the problem as one of finding matches between the intensity/depth edges obtained in one or more normal/MFC images to the rendered intensity/depth edges that are computed offline using a 3D CAD model of the objects.

We introduced a novel cost function that is significantly superior to the conventional chamfer cost, and developed a sub-linear time multi-view based pose estimation and refinement procedures.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a pose of an object in a scene, comprising a processor for performing steps of the method, comprising the steps of:
rendering sets of virtual images of a model of the object using a virtual camera, wherein each set of virtual images is for a different known pose of the model, and wherein the model is illuminated by a set of virtual light sources, and wherein there is one virtual image for each virtual light source in a particular set for a particular know pose;
constructing virtual depth edge map from each virtual image;
storing each set of depth edge maps in a database and associating each set of depth edge maps with the corresponding known pose;
acquiring a set of real images of the object in the scene with a real camera, wherein the object has an unknown pose, and wherein the object is illuminated by a set of real light sources, and wherein there is one real image for each real light source;
constructing real depth edge map for each real image; and
matching the real depth edge maps with the virtual depth edge maps of each set of virtual images using a cost function to determine the known pose that best matches the unknown pose, wherein the matching is based on locations and orientations of pixels in the depth edge maps.

2. The method of claim 1, where the real camera and the virtual camera are conventional, and the edges of the real and virtual images are used for pose estimation.

3. The method of claim 2, wherein the method is used for object detection and localization in an image from a database of stored query edge templates for various objects.

4. The method of claim 2, wherein the edges from the real and virtual images are partitioned into discrete orientation channels, and wherein the cost function sums matching scores across the orientation channels.

5. The method of claim 4, wherein the cost function is $$d_{DCM}(U, V) = \frac{1}{n} \sum_{u_i \in U} \min_{v_j \in V} |u_i - v_j| + \lambda |\phi(u_i) - \phi(v_j)|,$$

wherein $U=\{u_i\}$ are virtual pixels in the virtual edge maps, $V=\{v_j\}$ are real pixels in the real image edge maps, $\phi$ is an orientation of each pixel, $\lambda$ is a weighting factor, and $n=|U|$.

6. The method of claim 5, wherein the directions $\phi$ are computed modulo $\pi$, and an orientation error gives a minimum circular difference between the two directions.

7. The method of claim 1, wherein the camera is arranged on a robot arm for manipulating the object.

8. The method of claim 1, wherein the model is a computer-aided design model.

9. The method of claim 1, wherein the model is a set of edges for possible poses of the object.

10. The method of claim 1 where multiple models for different objects are stored simultaneously.

11. The method of claim 1, further comprising;
acquiring an ambient image of the scene using ambient light;
subtracting the ambient image from each real image.

12. The method of claim 1, wherein the matching uses directional chamfer matching to determine a coarse pose; and an optional procedure for refining the coarse pose.

13. The method of claim 1, further comprising:
dividing each real image by a maximum intensity image to determine a ratio image, and wherein the matching is based on the ratio images.

14. The method of claim 1, further comprising:
quantizing each virtual image and each real image into discrete orientation channels, and wherein the cost function sums matching scores across the orientation channels.

15. The method of claim 1, further comprising:
representing pixels in the virtual image and the real images by line segments; and
aligning the lines segments of the virtual images and the real images.

16. The method of claim 1, further comprising:
representing pixels in the virtual image and the real images by line segments; and
aligning the lines segments of the virtual images and the real images.

17. The method of claim 5 or 16, wherein the cost function for a given location is computed in sub-linear time in the number of edge points using 3D distance transforms and directional integral images.

18. The method of claim 1, wherein the edges can be computed using a conventional camera and Canny edge detection.

19. The method of claim 1, wherein a gallery of hand drawn or exemplar objects are detected and localized in images using the cost function and fast matching algorithm.

20. The method of claim 19, wherein poses of rigid or deformable objects are estimated using a gallery of exemplar images or shapes.

21. The method of claim 1 as applied to human body pose estimation.

22. The method of claim 1 as applied to object detection and localization in images.

* * * * *